US008787573B2

(12) United States Patent
Nam et al.

(10) Patent No.: US 8,787,573 B2
(45) Date of Patent: Jul. 22, 2014

(54) CIPHER COMMUNICATION METHOD AND APPARATUS FOR THE SAME

(75) Inventors: Taek-Jun Nam, Daejeon (KR); Byeong-Ho Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 43 days.

(21) Appl. No.: 13/572,458

(22) Filed: Aug. 10, 2012

(65) Prior Publication Data

US 2013/0308777 A1   Nov. 21, 2013

(30) Foreign Application Priority Data

May 17, 2012   (KR) ........................ 10-2012-0052651

(51) Int. Cl.
 *H04L 9/00* (2006.01)
(52) U.S. Cl.
 USPC ........... 380/255; 380/277; 380/278; 380/279; 380/280; 380/281; 380/282
(58) Field of Classification Search
 USPC .................................................. 380/277–282
 See application file for complete search history.

(56) References Cited

U.S. PATENT DOCUMENTS

| 5,222,137 A | 6/1993 | Barrett et al. |
| 6,157,723 A * | 12/2000 | Schultz .................... 380/273 |
| 2003/0105967 A1 | 6/2003 | Nam |
| 2006/0204003 A1 | 9/2006 | Takata et al. |
| 2008/0310624 A1* | 12/2008 | Celikkan et al. ............... 380/29 |

FOREIGN PATENT DOCUMENTS

| EP | 0784392 A2 | 7/1997 |
| JP | 10-341212 A | 12/1998 |
| JP | 2003-101528 A | 4/2003 |
| KR | 10-1998-0013071 A | 4/1998 |
| KR | 10-2003-0044654 A | 6/2003 |
| KR | 10-2006-0095471 A | 8/2006 |

* cited by examiner

*Primary Examiner* — Ghazal Shehni
(74) *Attorney, Agent, or Firm* — LRK Patent Law Firm

(57) ABSTRACT

A cipher communication method for an encryption apparatus an includes: receiving a second encryption key while performing a cipher communication using a first encryption key; storing encryption key input information on the first and second encryption keys in a static region; copying the stored encryption key input information into a dynamic region; selecting any one of the first and second encryption keys based on the copied encryption key input information and current time information; generating encryption key position information and encryption key selection information on the selected encryption key; and transmitting a cipher text and the encryption key selection information to another encryption apparatus connected to the encryption apparatus through a network such that the another encryption apparatus acquires an encryption key to decrypt the cipher text.

14 Claims, 7 Drawing Sheets

CIPHER COMMUNICATION METHOD AND APPARATUS FOR THE SAME

CROSS-REFERENCE(S) TO RELATED APPLICATIONS

This application claims priority to Korean Patent Application No. 10-2012-0052651, filed on May 17, 2012, which is incorporated herein by reference in its entirety.

BACKGROUND OF THE INVENTION

1. Field of the Invention

Exemplary embodiments of the present invention relate to a key input and management method for seamless cipher communication; and, particularly, to a system in which a transmitter selects an encryption key based on a set time and a receiver selects the same key as the transmitter using the received key select information (one bit) such that the transmitter and the receiver overcome a different key input number, a time difference therebetween, a different transmission delay time and perform seamless cipher communication.

2. Description of Related Art

In order to normally perform cipher communication, both a transmitter and a receiver must communicate using the same key. Furthermore, in order to seamlessly support the cipher communication, each of the transmitter and the receiver must receive a key to use next during the communication, and select a key to use for an actual communication, between the two keys. During this process, the transmitter and the receiver must select the proper key through a method of receiving and managing the two keys, different key input numbers, a time difference between the transmitter and the receiver, different transmission delays and so on, in order to seamlessly perform the cipher communication.

In an existing cipher communication, a transmitter transmits a variety of additional information including time information to a receiver, in order to accomplish the above-described purpose. Furthermore, in order to solve the key mismatch problem, which occurs at a key rotation time due to the time difference between devices and different transmission delays, a plain text is obtained by using both keys for a predetermined time, and a test must be performed on the plain text. Therefore, the efficiency of data transmission/reception decreases, and the processing time increases.

SUMMARY OF THE INVENTION

An embodiment of the present invention is directed to a system in which a transmitter and a receiver select the same encryption key to overcome different key input numbers, a time difference therebetween, and different transmission delays, in order to perform seamless cipher communication.

That is, the transmitter selects a key based on time information at a transmission time point, and transmits additional one-bit pieces of information on the selected key to the receiver, and the receiver selects a key using the key information. Therefore, while a smaller amount of information is used than an existing system, key management may be efficiently performed to provide seamless cipher communication.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a cipher communication method for an encryption apparatus an includes: receiving a second encryption key while performing a cipher communication using a first encryption key; storing encryption key input information on the first and second encryption keys in a static region; copying the stored encryption key input information into a dynamic region; selecting any one of the first and second encryption keys based on the copied encryption key input information and current time information; generating encryption key position information and encryption key selection information on the selected encryption key; and transmitting a cipher text and the encryption key selection information to another encryption apparatus connected to the encryption apparatus through a network such that the other encryption apparatus acquires an encryption key to decrypt the cipher text.

In accordance with another embodiment of the present invention, an encryption apparatus includes: an interface unit configured to receive a second encryption key while performing a cipher communication using a first encryption key; a storage management unit configured to store encryption key input information on the first and second encryption keys in a static region and store the stored encryption key input information in a dynamic region; and a control unit configured to select any one of the first and second encryption keys based on the copied encryption key information and current time information, generate encryption key position information and encryption key selection information on the selected encryption key, and transmit a cipher text and the encryption key selection information to another encryption apparatus connected to the encryption apparatus through a network such that the other encryption apparatus acquires an encryption key to decrypt the cipher text.

DESCRIPTION OF SPECIFIC EMBODIMENTS

Figure 1:
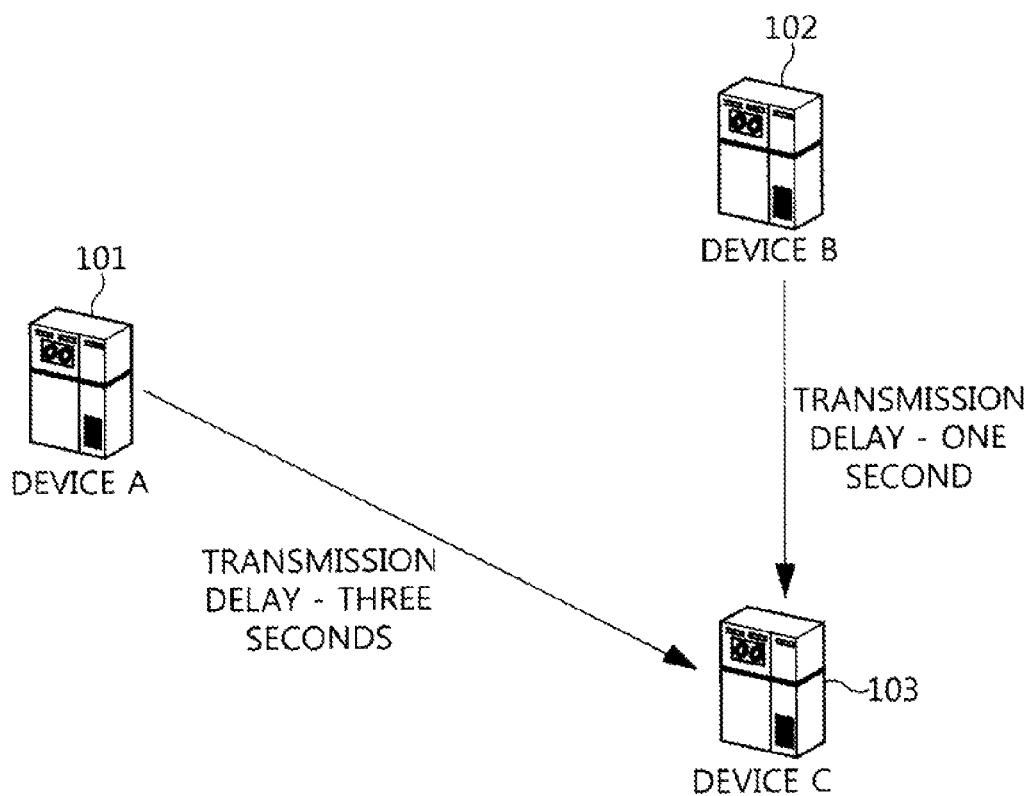
FIG. 1 illustrates a cipher communication system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 illustrates a cipher communication system in accordance with an embodiment of the present invention.

Depending on embodiments, both a transmitter and a receiver may select the same key even when there is a difference in operation times of devices or transmission delays between devices are different, in order to perform a seamless cipher communication.

FIG. 1 illustrates a key management method of a third device 103 when first and second devices 101 and 102 communicate with the third device 103.

For example, the first device has a transmission time point of 11:59:59, and performs encryption using a first encryption key, and the second device has a transmission time point of 12:00:00, and performs encryption using a second encryption key. Furthermore, the end time of the first encryption key is 11:59:59, and the start time of the second encryption key is 12:00:00. Furthermore, a transmission delay time between the first and second devices is 3 seconds, and a transmission delay time between the second and third devices is 1 second.

Therefore, the third device 103 receives data transmitted from the second device 102 at 12:00:02, and performs a cipher communication using the second encryption key. Furthermore, the third device 103 receives data transmitted from the first device 101 at 12:00:02, and performs a cipher communication u sing the first encryption key.

That is, the third device 103 performs encryption using the second encryption key from 12:00:00, and decrypts the data transmitted from the second device 102 using the second encryption key at 12:00:01. Then, when decrypting the data transmitted from the first device 101 at 12:00:02, the third device 103 uses the first encryption key.

When only the reception time is considered, the second encryption key should be used. However, the third device 103 changes an encryption key to use into the first encryption key according to key selection information '0' transmitted from the first device 101, and performs the decryption.

Then, when the third device 103 performs encryption, the third device 103 selects and uses the second encryption key based on its time.

In this way, the time difference between devices and the transmission delays may be overcome to perform a seamless cipher communication.

Figure 2:
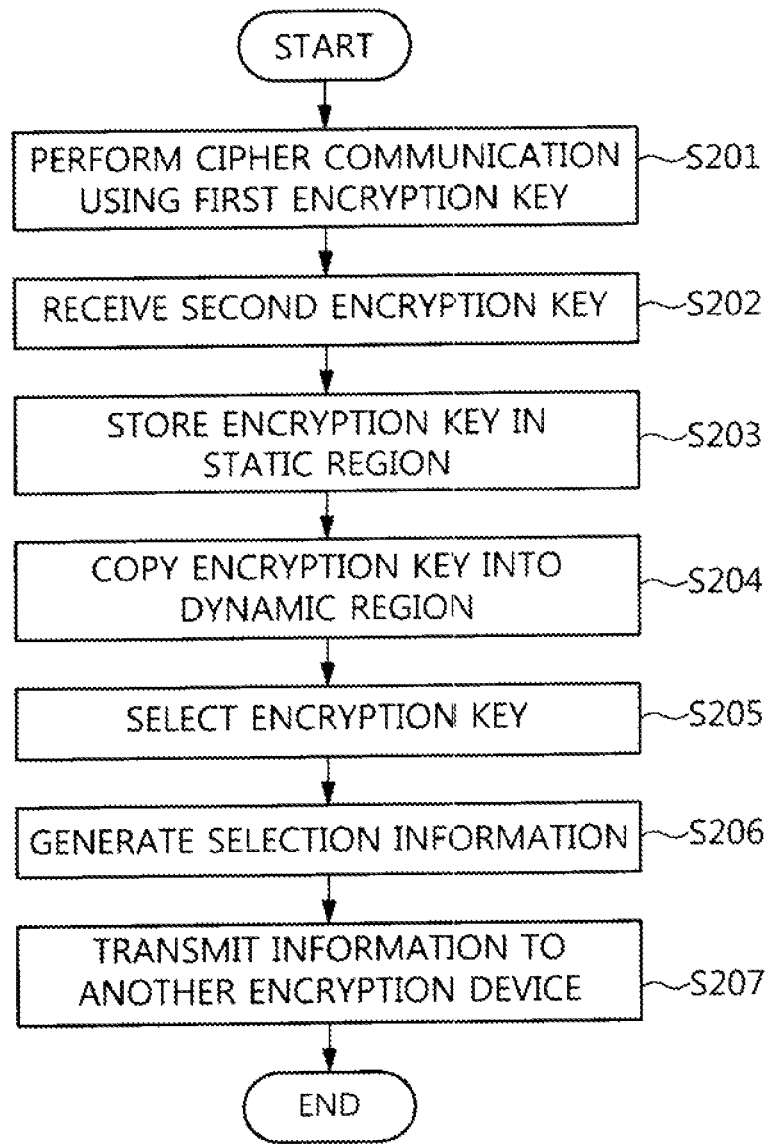
FIG. 2 is a flow chart showing the flow of an encryption method in accordance with another embodiment of the present invention.

FIG. 2 is a flow chart showing the flow of an encryption method in accordance with another embodiment of the present invention.

Depending on embodiments, while performing a cipher communication using a first encryption key at step S201, a device receives a second encryption key at step S202.

Then, the device stores encryption key input information on the first and second encryption keys in a static region at step S203, and copies the stored encryption key input information into a dynamic region at step S204.

Furthermore, depending on embodiments, the encryption key input information on the first encryption key and the encryption key input information on the second encryption key may be stored in different regions from each other, respectively, among regions included in the static region.

The encryption key input information may include an encryption key, an encryption key start time, and an encryption key end time.

Then, the device selects any one of the first and second encryption keys based on the copied encryption key input information and current time information at step S205, and generates encryption key position information and encryption key selection information on the selected encryption key at step S206.

The encryption key selection information corresponds to '0' or '1', and the device compares the start time of the first encryption key to the start time of the second encryption key. When the selected key is an encryption key of which the start time is faster, the encryption key selection information may be generated as 0, and when the selected key is an encryption key of which the start time is slower, the encryption key selection information may be generated as 1.

Furthermore, the device transmits a cipher text and the encryption key selection information to another device connected to the device through a network such that the device may acquire an encryption key to decrypt the cipher text, at step S207.

Depending on embodiments, the device may compare the position information of the selected key within the static region to the position information of the key within the dynamic region. When the position information of the selected key within the static region is different from the position information of the key within the dynamic region, the device may copy the corresponding key into the dynamic region from the static region to update the position information of the key.

Furthermore, depending on the embodiments, the device may perform the following steps in relation to a method of receiving encrypted data. While performing a cipher communication using a third encryption key, the device may receive a fourth encryption key, store encryption key input information on the third and fourth encryption keys in the static region, copy the stored encryption key input information into the dynamic region, receive encryption key selection information and a cipher text from another device, select an encryption key to decrypt the received cipher text based on the received encryption key selection information and the encryption key input information copied into the dynamic region, and decrypt the cipher text based on the selected encryption key.

That is, while two keys are managed through the above-described steps, the position of a key to be used currently and the position of a key to be used next are not fixed, and the key to be used next is always inputted at the opposite side of the key to he used currently. Therefore, an additional process of managing the position of the key to be used and the position of the key to be used next is not required.

Furthermore, as the keys are managed by different memories such as the low-speed static region and the high-speed dynamic region, a key may be inputted to the storage region even during a cipher communication, and the process of selecting a key and generating key selection information may be quickly performed through the dynamic region.

Figure 3:
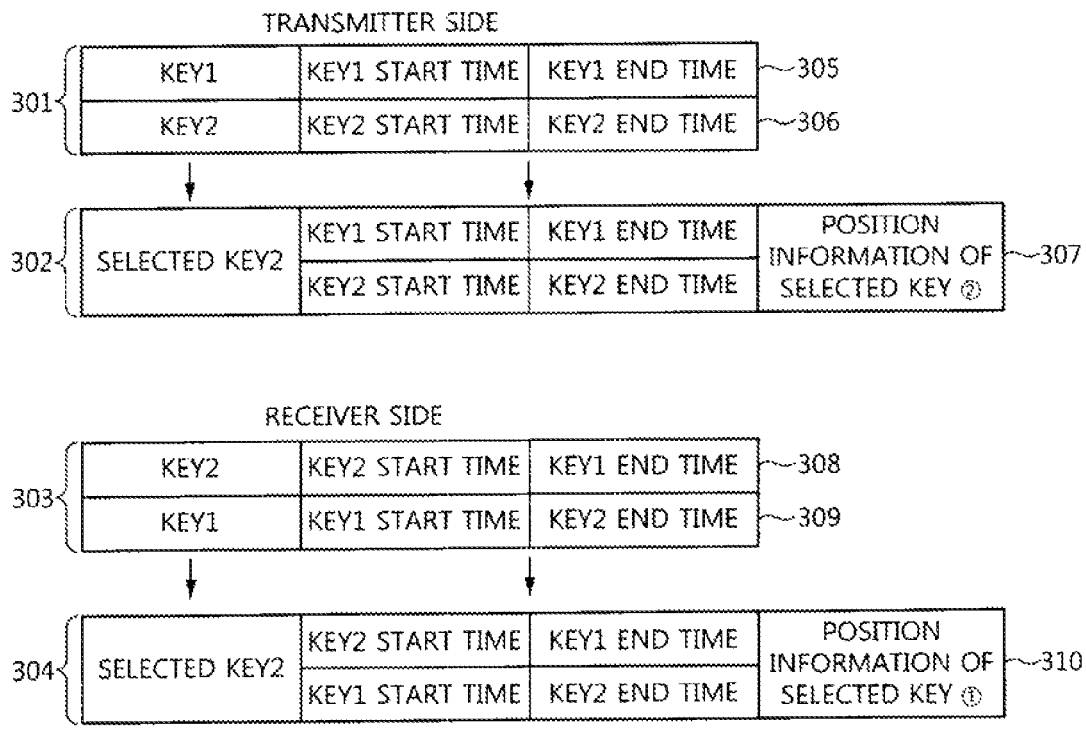
FIG. 3 is a diagram showing an encryption key storage process in accordance with the embodiment of the present invention.

FIG. 3 is a diagram showing an encryption key storage process in accordance with the embodiment of the present invention.

Depending on the embodiment, a received key and information on start and end times of the key may be stored in a static region 301 where data may be continuously stored without power. The static region may correspond to a part of a storage region, for example, a Flash memory region.

Furthermore, when the storing is performed, the key is inputted to a different region 305 from position information 306 of the currently-used key (when the position information of a selected encryption key corresponds to the region 306, a new encryption key may be stored in a region 305).

Then, the key selected through time information at the time of system initialization and information on start and end times of the two keys are copied into the dynamic region 302 having a high speed. The dynamic region may correspond to a part of the storage region, for example, an SDRAM memory region.

Furthermore, position information 307 of the copied key within the static region is stored together (the information stored in the region 305 or 306).

When communication starts, a transmitter compares its time information to the start and end times of the two keys within the dynamic region, and generates the position information of the selected key within the static region (the information stored in the region 305 or 306) and key selection information (0 or 1).

At this time, when the position information of the selected key within the static region is different from the position information 307 of the key within the dynamic region, the corresponding key may be copied into the dynamic region, and the position information of the key may be updated.

The encryption key input information may include an encryption key, an encryption key start time, and an encryption key end time.

Furthermore, a receiver receiving encrypted data may also include a static region 303 and a dynamic region 304. The receiver may store a first encryption key 309 and a second encryption key 308 in different regions from each other, and store position information 310 of a selected encryption key in the dynamic region 304.

Figure 4:
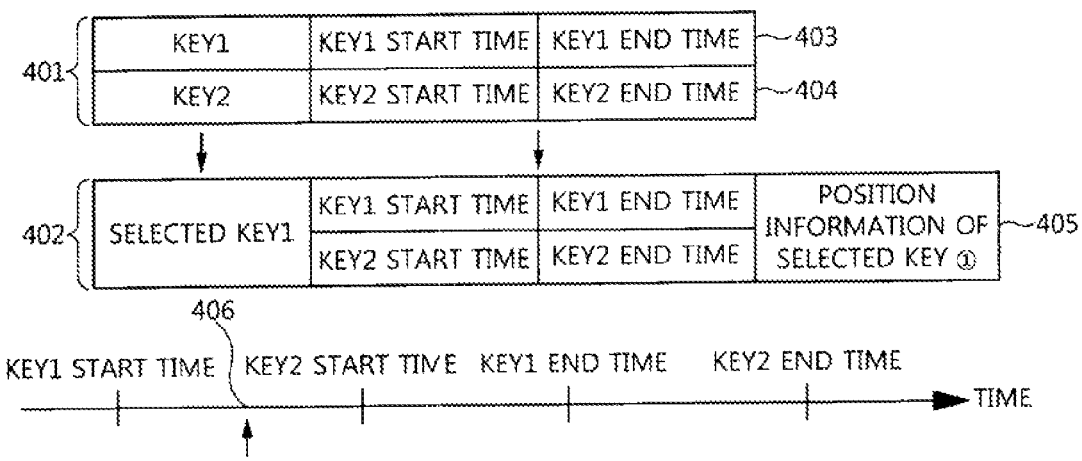
FIGS. 4 and 5 are diagrams showing an encryption key management process between a transmitter and a receiver in accordance with the embodiment of the present invention.
Figure 5:
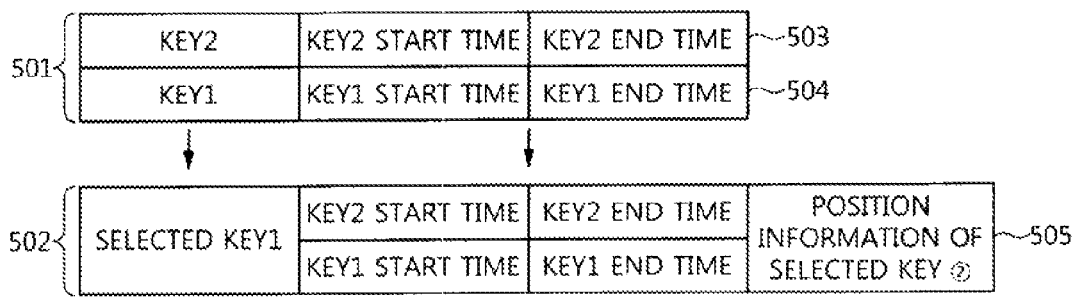

FIGS. 4 and 5 are diagrams showing an encryption key management process between a transmitter and a receiver in accordance with the embodiment of the present invention.

Referring to FIG. 4, the transmitter compares its time information 406 to start and end times of two encryption keys stored in a dynamic region 402 at the time of encryption, as described with reference to FIG. 3, and acquires position information of a key to use within a static region (information stored in a region 403 or 404).

The acquired position information is compared to position information 405 on where an encryption key of the dynamic region 402 is positioned in the static region. When the acquired position information is different from the position information 405, the corresponding encryption key is copied into the dynamic region 402 from the static region 401. Furthermore, the encryption key selection information (0 or 1) may be generated by comparing the start times of first and second encryption keys within the dynamic region. In this case, when the selected encryption key is an encryption key of which the start time is faster, the encryption key selection information is generated as 0, and when the selected encryption key is an encryption key of which the start time is slower, the encryption key selection information is generated as 1.

The generated encryption key selection information is transmitted to the receiver. The receiver compares the received encryption key selection information to the start times of the first and second encryption keys within the dynamic region 502, and acquires the position information of an encryption key to use.

When the position information of the encryption key to use is different from previously-stored position information 505, the receiver copies the corresponding key into the dynamic region 502 from the static region 501, and performs decryption.

Figure 6:
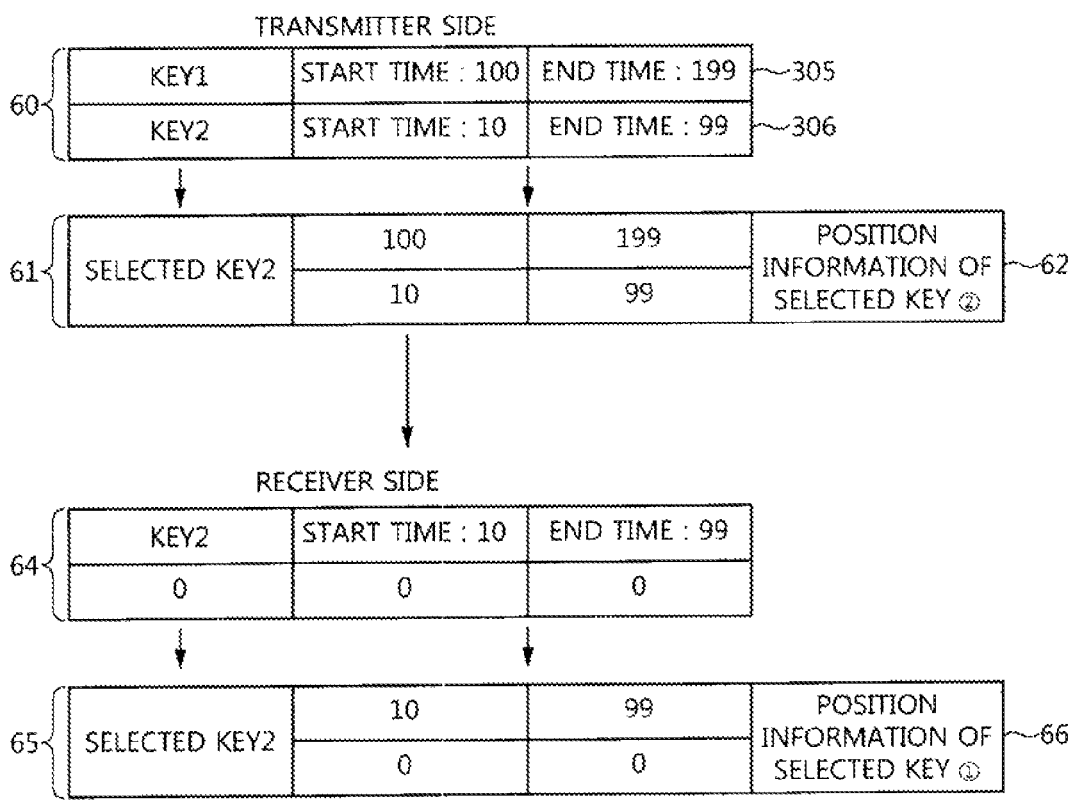
FIG. 6 is a diagram showing an encryption key selection process in accordance with the embodiment of the present invention.

FIG. 6 is a diagram showing an encryption key selection process in accordance with the embodiment of the present invention.

Depending on embodiments, even when the transmitter and the receiver cannot receive encryption keys at the same time point, the transmitter and the receiver may be designed to select the same encryption key.

When an encryption key to use next is inputted to the transmitter in a state where each of the transmitter and the receiver has one encryption key, a situation in which the transmitter has two encryption keys (60) and the receiver has one encryption key (64) may occur. The transmitter selects an encryption key of which the start time is slower, between the two encryption keys, and transmits encryption key selection information as '0' to the receiver (63). The receiver selects the encryption key corresponding to a position ② using the encryption key selection information and the start times of the first and second encryption keys. Furthermore, when checking the start time of the encryption key corresponding to the position ②, the receiver recognizes that the start time is 0 (65), When each device has no encryption key at the initial stage, the device manages encryption key information as '0'. Furthermore, when the validity of a corresponding encryption key expires, the device resets the encryption key information to '0'. Therefore, when an encryption key start time is '0', it means that no encryption key exists at the corresponding position. The receiver finally selects the second encryption key corresponding to a position ① through the above-described process, thereby performing normal decryption.

Figure 7:
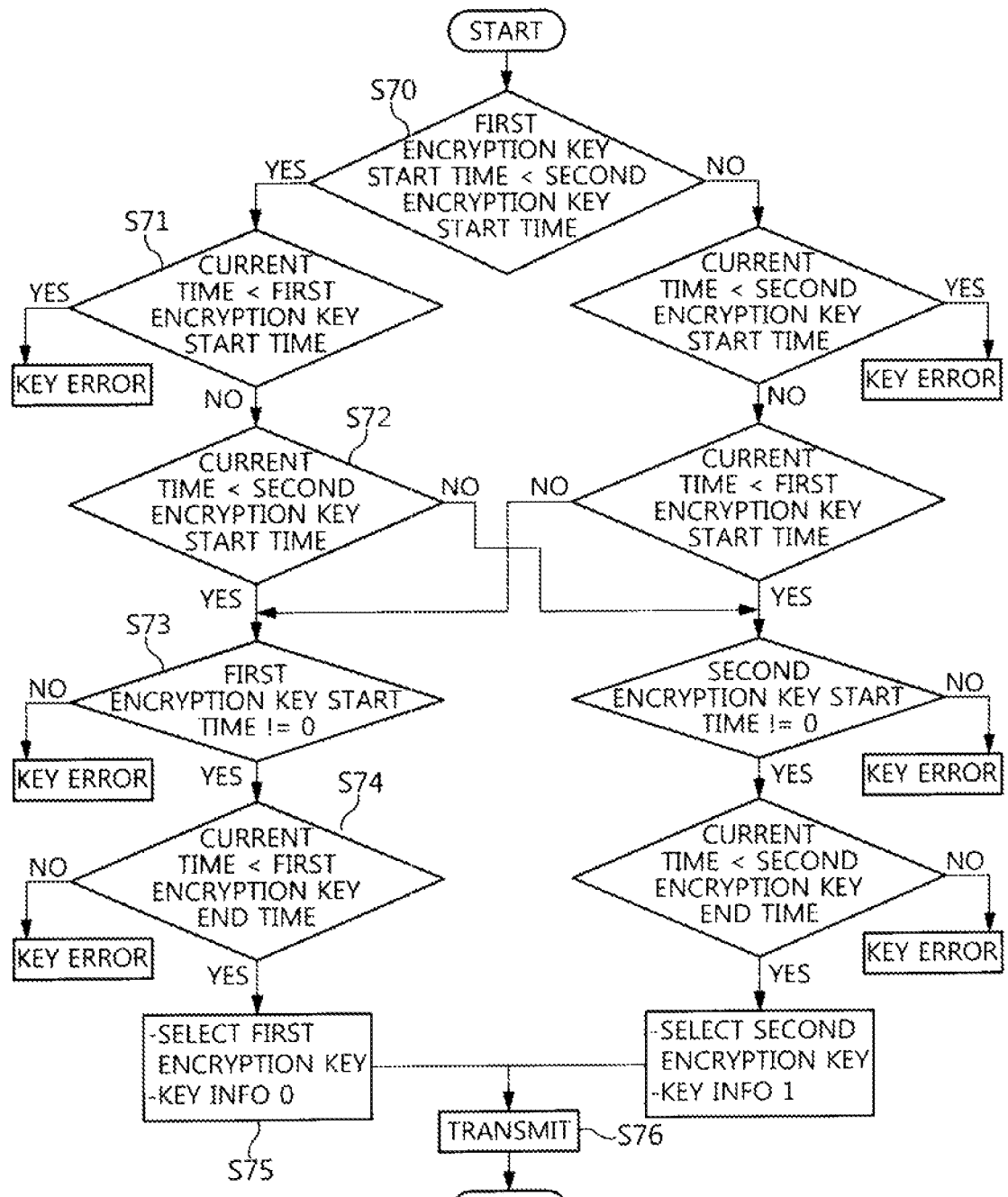
FIG. 7 is a flow chart showing an encryption key selection process of the transmitter in accordance with the embodiment of the present invention.

FIG. 7 is a flow chart showing an encryption key selection process of the transmitter in accordance with the embodiment of the present invention.

The transmitter compares starts times of first and second encryption keys within the dynamic region at step S70. When the start time of the first encryption key is faster, the transmitter compares the current time to the start time of the first encryption key at step S71. When the current time is faster than the start time of the first encryption key, the transmitter compares the current time to the start time of the second encryption key at step S72. When the current time is slower than the start time of the second encryption key, the transmitter checks whether the start time of the first encryption key is 0 or not at step S73. When the start time of the first encryption key is not 0, the transmitter compares the current time to an end time of the first encryption key at step S74. When the current time is slower than the end time of the first encryption key, the transmitter selects the first encryption key, and generates key selection information as 0 at step S75. Furthermore, the transmitter encrypts data using the selected key, and then transmits the encrypted data with the key selection information of 0 at step S76. The rest of the process is performed by the same principle.

Figure 8:
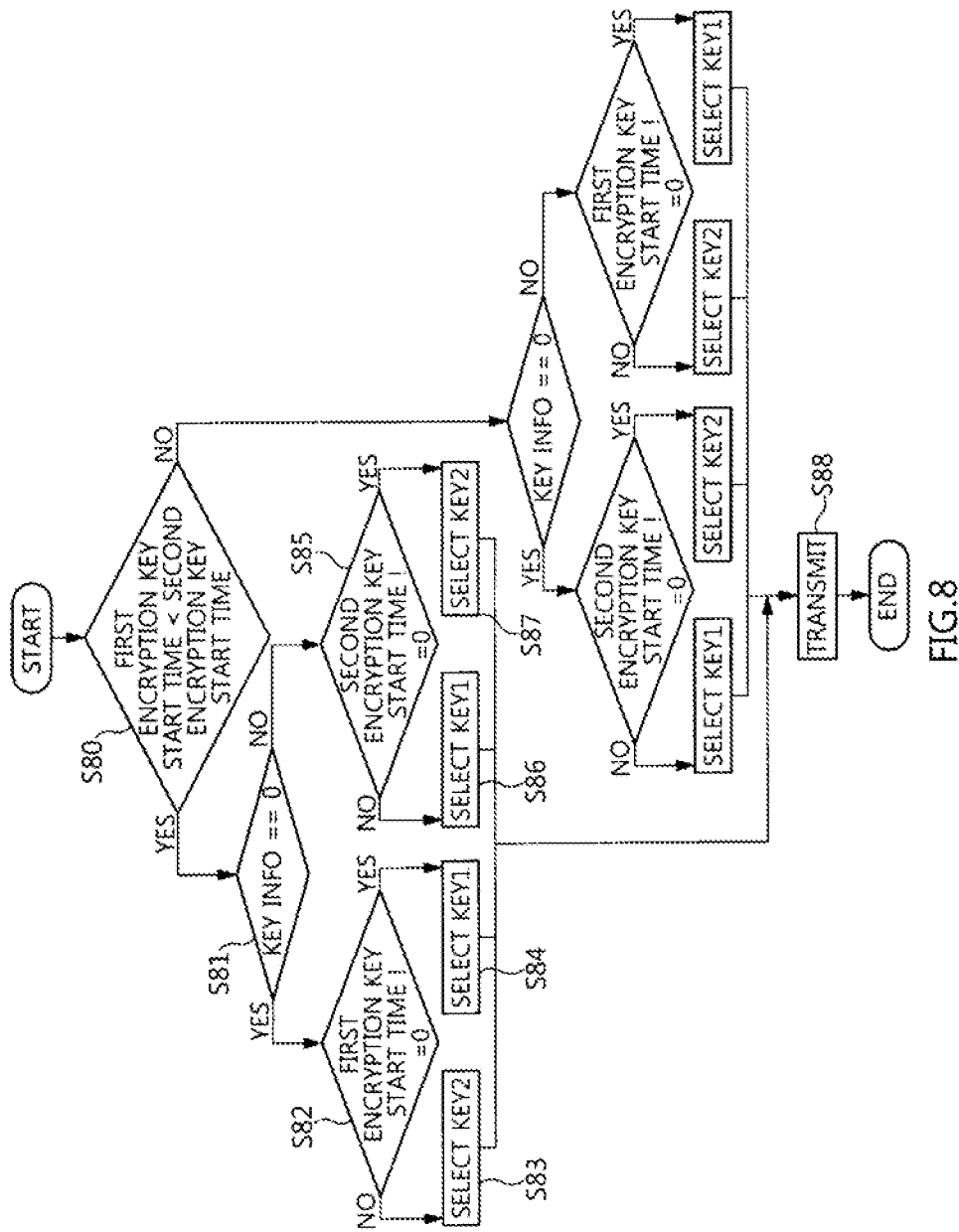
FIG. 8 is a flow chart showing an encryption key selection process of the receiver in accordance with the embodiment of the present invention.

FIG. 8 is a flow chart showing an encryption key selection process of the receiver in accordance with the embodiment of the present invention.

The receiver compares the start times of first and second encryption keys within the dynamic region at step S80. When the start time of the first encryption key is slower than the start time of the second encryption key, the receiver determines whether encryption key selection information is 0 or not, at step S81.

When the encryption key selection information is 0, the receiver determines whether the start time of the first encryption key is 0 or not, at step S82. When the start time of the first encryption key is 0, the first encryption key does not exist. Therefore, the receiver selects the second encryption key at step S83. When the start time of the first encryption key is not 0, the receiver selects the first encryption key at step S84.

When the key selection information is not 0, the receiver determines whether the start time of the second encryption key is 0 or not, at step S85. When the start time of the second encryption key is 0, the second encryption key does not exist. Therefore, the receiver selects the first encryption key at step S86. When the start time of the second encryption key is not 0, the receiver selects the second encryption key at step S87. The rest of the process is performed by the same principle. When the key is selected, the receiver performs decryption using the corresponding key at step S88.

Figure 9:
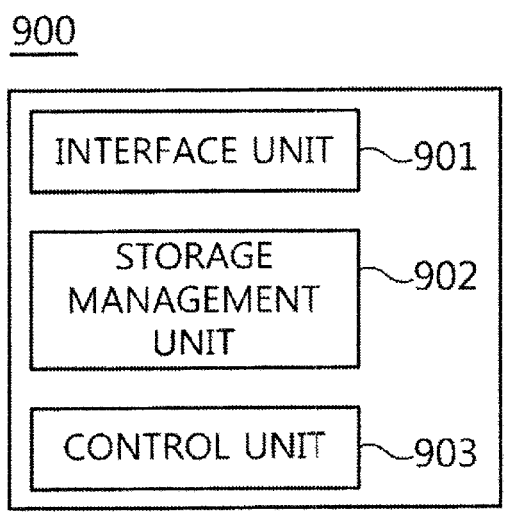
FIG. 9 is a diagram illustrating the configuration of an encryption apparatus in accordance with another embodiment of the present invention.

FIG. 9 is a diagram showing the configuration of an encryption apparatus in accordance with another embodiment of the present invention.

Depending on embodiments, the encryption apparatus 900 may include an interface unit 901, a storage management nit 902, and a control unit 903.

The interface unit 901 may receive a second encryption key while performing a cipher communication using a first encryption key.

The storage management unit 902 may store encryption key input information on the first and second encryption keys in a static region, and store the stored encryption key input information in a dynamic region.

Furthermore, the storage management unit 902 may store the encryption key input information on the first encryption key and the encryption key input information on the second encryption key in different regions from each other, among regions included in the static region.

The encryption key input information may include an encryption key, an encryption key start time, and an encryption key end time.

The controller 903 may select any one of the first and second encryption keys based on the copied encryption input information and current time information, generate encryption key position information and encryption key selection information on the selected encryption key, and transmit a cipher text and the encryption key selection information to another encryption apparatus connected to the encryption apparatus 900 such that the encryption apparatus may acquire an encryption key to decrypt the cipher text.

The encryption key selection information may correspond to 0 or 1.

The control unit 903 may compare the start times of the first and second encryption keys. When the selected encryption key is an encryption key of which the start time is faster, the control unit 903 may generate the encryption key selection information as 0, and when the selected encryption key is an encryption key of which the start time is slower, the control unit 903 may generate the encryption key selection information as 1.

The control unit 903 may compare the position information of the selected key within the static region to the position information of the key within the dynamic region. When the position information of the selected key within the static region is different from the position information of the key within the dynamic region, the control unit 903 may copy the corresponding key into the dynamic region from the storage region to update the position information of the key.

When third and fourth encryption keys are inputted through the interface unit 901, the storage management unit 902 may store encryption key input information on the third and fourth encryption keys in the static region, and copy the stored encryption key input information into the dynamic region.

When receiving encryption key selection information and a cipher text from another encryption apparatus, the control unit 903 may select an encryption key to decrypt the received cipher text based on the received encryption key selection information and the encryption key input information copied into the dynamic region, and decrypt the cipher text based on the selected encryption key.

In accordance with the embodiments of the present invention, it is possible to provide the key management method capable of overcoming different key input numbers, a time difference between devices, and different transmission delays, thereby providing seamless cipher communication.

While the present invention has been described with respect to the specific embodiments, it will be apparent to those skilled in the art that various changes and modifications may be made without departing from the spirit and scope of the invention as defined in the following claims.

What is claimed is:

1. A cipher communication method of an encryption apparatus for seamless cipher communication with another encryption apparatus, the method comprising:
   receiving a second encryption key from another encryption apparatus connected to the encryption apparatus over a network while the encryption apparatus is using a first encryption key to make a cipher communication;
   storing encryption key input information on the first encryption key and the second encryption key in a static region;
   copying the stored encryption key input information into a dynamic region;
   selecting any one of the first and second encryption keys by comparing the copied encryption key input information on the first encryption key, the copied encryption key input information on the second encryption key, and current time information;
   generating encryption key position information and encryption key selection information on the selected encryption key; and
   transmitting a cipher text and the encryption key selection information to the other encryption apparatus such that the other encryption apparatus acquires an encryption key to decrypt the cipher text.

2. The cipher communication method of claim 1, wherein the encryption key selection information comprises 0 or 1.

3. The cipher communication method of claim 2, wherein the encryption key selection information is generated as 0 when the selected encryption key is an encryption key of which the start time is faster between the first and second encryption keys, and generated as 1 when the selected encryption key is an encryption key of which the start time is slower between the first and second encryption keys.

4. The cipher communication method of claim 1, wherein the encryption key input information comprises information about encryption key, an encryption key start time, and an encryption key end time.

5. The cipher communication method of claim 1, wherein the storing the encryption key input information on the first and second encryption keys in the static region comprises storing the encryption key input information on the first encryption key and the encryption key input information on the second encryption key in different regions from each other among regions included in the static region.

6. The cipher communication method of claim 1, further comprising:
   comparing position information of the selected key within the static region to position information of the key within the dynamic region; and
   when the position information of the selected key within the static region is different from the position information of the key within the dynamic region, copying the corresponding key into the dynamic region from the static region and updating the position information of the key.

7. The cipher communication method of claim 1, further comprising:
receiving a fourth encryption key while performing a cipher communication using a third encryption key;
storing encryption key input information on the third and fourth encryption keys in a static region;
copying the stored encryption key input information into a dynamic region;
receiving encryption key selection information and a cipher text from another encryption apparatus;
selecting an encryption key to decrypt the received cipher text based on the received encryption key selection information and the encryption key input information copied into the dynamic region; and
decrypting the cipher text based on the selected encryption key.

8. An encryption apparatus for seamless cipher communication with another encryption apparatus, comprising:
an interface unit configured to receive a second encryption key from another encryption apparatus connected to the encryption apparatus over a network while performing a cipher communication using a first encryption key;
a storage management unit configured to store encryption key input information on the first and second encryption keys in a static region and store the stored encryption key input information in a dynamic region; and
a controller configured to select any one of the first and second encryption keys by comparing the copied encryption key input information on the first encryption key, the copied encryption key input information on the second encryption key, and current time information, generate encryption key position information and encryption key selection information on the selected encryption key, and transmit a cipher text and the encryption key selection information to the other encryption apparatus such that the other encryption apparatus acquires an encryption key to decrypt the cipher text.

9. The encryption apparatus of claim 8, wherein the storage management unit stores the encryption key input information on the first encryption key and the encryption key input information on the second encryption key in different regions from each other among regions included in the static region.

10. The encryption apparatus of claim 8, wherein the encryption key input information comprises information about encryption key, an encryption key start time, and an encryption key end time.

11. The encryption apparatus of claim 8, wherein the encryption key selection information comprises 0 or 1.

12. The encryption apparatus of claim 11, wherein the controller compares starts times of the first and second encryption keys, generates the encryption key selection information as 0 when the selected key is an encryption key of which the start time is faster between the first and second encryption keys, and generates the encryption key selection information 1 when the selected key is an encryption key of which the start time is slower.

13. The encryption apparatus of claim 8, wherein the controller compares position information of the selected key within the static region to position information of the key within the dynamic region, and copies the corresponding key into the dynamic region from the static region to update the position information of the key, when the position information of the selected key within the static region is different from the position information of the key within the dynamic region.

14. The encryption apparatus of claim 8, wherein the interface unit receives a fourth encryption key while performing a cipher communication using a third encryption key,
wherein the storage management unit stores encryption key input information on the third and fourth encryption keys in the static region, and copies the stored encryption key input information into the dynamic region, and
wherein the controller selects an encryption key to decrypt the received cipher text based on the received encryption key selection information and the encryption key input information copied into the dynamic region, and decrypts the cipher text based on the selected encryption key, when encryption key selection information and a cipher text are received from another encryption apparatus.

* * * * *